United States Patent [19]

Yoshihiro

[11] Patent Number: 4,813,039
[45] Date of Patent: Mar. 14, 1989

[54] LOOP TRANSMISSION SYSTEM AND DATA TRANSMISSION CONTROL METHOD

[75] Inventor: Takiyasu Yoshihiro, Higashimurayama, Japan

[73] Assignee: Hitachi, Ltd., Tokyo, Japan

[21] Appl. No.: 117,853

[22] Filed: Nov. 6, 1987

[30] Foreign Application Priority Data

Nov. 7, 1986 [JP]   Japan ............................... 61-263738

[51] Int. Cl.⁴ ............................................... H04J 3/16
[52] U.S. Cl. .................................... 370/89; 340/825.05
[58] Field of Search ....................... 370/85, 89, 60, 94, 370/95, 86; 340/825.05

[56] References Cited

U.S. PATENT DOCUMENTS

| | | | |
|---|---|---|---|
| 4,494,233 | 1/1985 | Bahr et al. | 370/89 |
| 4,567,590 | 1/1986 | Bedermas | 370/89 |
| 4,593,280 | 6/1986 | Gron | 320/86 |
| 4,604,742 | 8/1986 | Hamada et al. | 370/89 |
| 4,701,908 | 10/1987 | Ikeda | 370/89 |

FOREIGN PATENT DOCUMENTS 57-81746  5/1982  Japan .
59-148447  8/1984  Japan ................................... 370/89

Primary Examiner—Robert L. Griffin
Assistant Examiner—Frank M. Scutch, III.
Attorney, Agent, or Firm—Pennie & Edmonds

[57] ABSTRACT

A data transmission control unit having a function of receiving a token having source address information on a loop transmission line, getting a transmission right, transmitting the information frame and then sending the token to abandon the transmission right, comprises means for determining whether the relay of the token sent by its own unit successed or not based on the time elapsed after the token has been sent, and control means for not transmitting the token when the relay was successful and retransmitting a new token only when the relay was not successful.

4 Claims, 4 Drawing Sheets

LOOP TRANSMISSION SYSTEM AND DATA TRANSMISSION CONTROL METHOD

BACKGROUND OF THE INVENTION

The present invention relates to a loop transmission control system, and more particularly to method and apparatus for controlling transmission of a token frame signal in a loop transmission system by a token passing system.

A token passing system has been known as a data transmission system which prevents frames sent from data transmission control units from conflicting each other on a transmission path in a loop transmission system having a plurality of data transmission control unit or one node unit connected through one or more loop transmission lines. In the token passing system, a frame including token indication indicative of a transmission right is circulated through the loop transmission line, a transmission control unit having no transmission request relays the frame, and a transmission control unit having a transmission request waits for the token frame which will be circulated and, when it arrives, sends a message frame while it holds the token frame. The token frame held by the transmission control unit is again sent to the loop transmission line after the message frame has been sent. The transmission control unit which sends the token frame following to the message changes a source address of the token frame to an address assigned to its own unit.

In the loop transmission system which employs the token passing system, a leading portion of the token circulated through the loop conflicts to a main portion or trailing portion of the token being sent depending on a relationship between a length of the loop transmission line and a data delay time through the data transmission units so that the relay of the token in the sending unit is incomplete and the token may be lost on the loop. In the loop transmission system, if there is no data transmission request from any terminal unit connected to the transmission control unit, the token frame is circulated through the loop transmission line in a minimum delay time. Accordingly, in a loop transmission system having a relatively short loop transmission line length, if the transmission control unit which has just sent the message frame attempts to release the token, the leading portion of the token circulates through the loop before the token frame has been sent and it is not transmitted because it overlaps with the transmission of the main portion or trailing portion of the token. When the sending unit relays the received frame after the transmission of the token frame, the token frame is partially lost and the token frame is eventually lost on the loop. In JP-A-57-81746, in order to prevent the loss of the token frame, when a transmission control unit which is sending a token frame receives the token frame which it has sent, the received token is aborted in anticipation of the loss of the token even if a complete form of token frame has been actually relayed, and the token frame is again sent. However, in the prior art system, since there is a large delay time before the complete form of token frame circulates through the loop transmission line, the other transmission control unit on the network takes a long time to get the token if a data send request occurs in the other transmission control unit.

SUMMARY OF THE INVENTION

It is an object of the present invention to provide a loop transmission system having a reduced relay delay time of a token frame.

It is another object of the present invention to provide loop transmission system and data transmission control system in which a data transmission unit which is a sending source of a token frame determines whether relay of the token frame has successed or not and resends the token frame if the relay is unsuccessful.

In order to achieve the above objects, in the loop transmission system of the present invention, when the data transmission control unit which is the sending source of the token frame receives the token frame which its own unit has sent, it determines whether the reception is within a predetermined time after the sending of the token frame, and resends the token frame if the receipt is within the predetermined time. After the data transmission control unit has sent the token frame, it is in a mode to relay the received frame, and when it receives the token frame which its own unit has sent the predetermined time later, there is no conflict between the transmitted token frame and the received token frame and the unit determines that normal token relay is accomplished.

The token frame sent to the loop transmission line and normal message (information) frame each has a flag for indicating an end of frame, at a frame end portion so that whether the received frame is normal or not can be determined when the end flag is received. A partially lost frame due to incomplete relay, and a relay frame having a predetermined field thereof substituted by an invalid signal pattern (time fill signal) because the source data transmission control unit erases the message circulated through the loop, flow over the loop. The invalid frame and the normal frame cannot be distinguished during the reception of the frame until the end flag is received. In the present invention, after each data transmission control unit has completed the transmission of the token frame, it sets a decision period which is longer than [word length of token frame - 1]octets so that it determines whether the end flag of the token frame which was sent from its own unit has been received or not in that period. If it has been received in that period, it is determined that the leading portion of the token frame has not been relayed downstream because it was received during the transmission of the token frame. Accordingly, the token frame is resent only in this case.

The foregoing and other objects, advantages, manner of operation and novel features of the present invention will be understood from the following detailed description when read in connection with the accompanying drawings.

DESCRIPTION OF THE PREFERRED EMBODIMENTS

Figure 1:
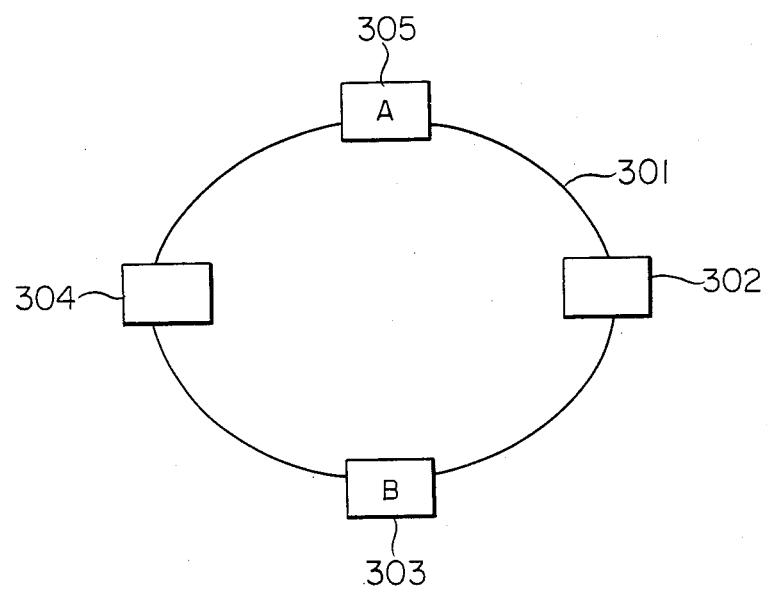
FIG. 1 shows an overall configuration of a network system to which the present invention is applied.

FIG. 1 shows an overall configuration of a loop transmission system to which the present invention is applied. Data transmission control units 302, 303, 304 and 305 connected in a loop through a transmission line 301 are connected to terminal devices or data processors, not shown. When there is no data transmission request from the associated terminal device, each of the data transmission control units 302-305 relays a token frame on the loop transmission line 301 to a downward transmission control unit. When the data transmission unit having a data transmission request from the terminal device receives the token frame, it holds the token frame and sends a message frame including data from the terminal device. After the message frame has been sent, the held token frame is resent to the transmission line.

Figure 2:
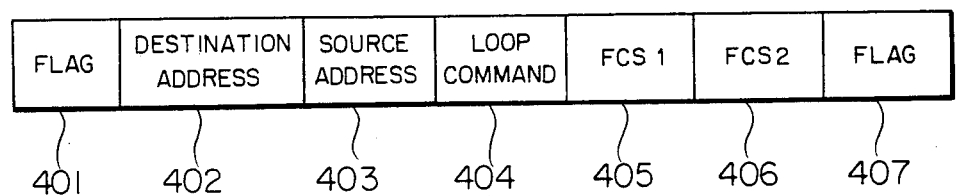
FIG. 2 shows a format of a communication frame.

FIG. 2 shows a format of a token frame circulated through the loop transmission line. The token frame comprises a flag field 401 indicating a beginning of the frame, a destination address field 402, a source address field 403, a frame type code field 404, check bit fields 405 and 406 for checking validity of the frame, and a flag field 407 for indicating an end of the frame. In the illustrated example, the frame is of 7 octets length. When the frame type field (loop command or frame control code) 404 includes a type code indicating a token, a global address for broadcasting is recorded in the destination address field 402. A normal message frame which transmits data from the terminal device has a field including message information between the fields 404 and 405. When the message frame has circulated through the loop, the source data transmission control unit substitutes the fields FCS 405 - flag 407 with a predetermined invalid pattern in order to erase (invalidate) the message.

In order to assist the understanding of the present invention, the loss of the token frame and the retransmission of the token frame in the prior art are explained with reference to FIGS. 3 and 4. In order to simplify the explanation, a simple network having two data transmission control units A and B on a loop is assumed. The transmission control unit A sends a token frame 501 and the transmission control unit B relays it to the transmission control unit A as a token frame 503. To denotes a relay delay time in each of the transmission control units.

Figure 3:
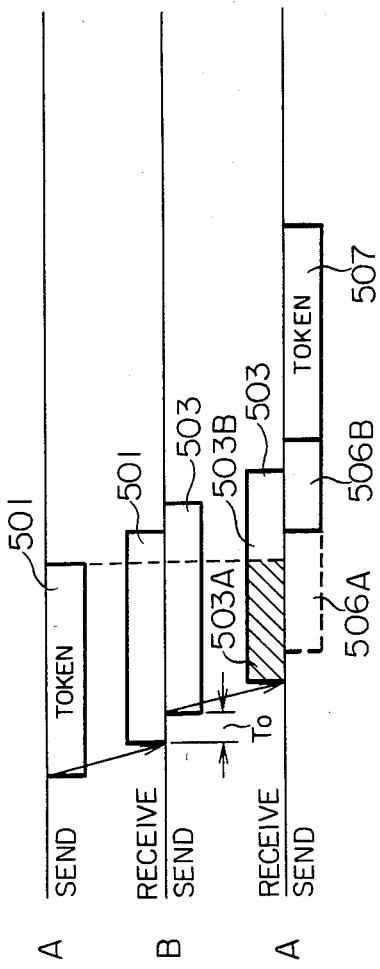
FIGS. 3 and 4 show time charts for illustrating re-transmission of a token frame in prior art data transmission control.

In FIG. 3, the loop transmission line is short, and the token frame 503 relayed by the transmission control unit B is sent back through the loop before the transmission control unit A completes the transmission of the token 501. Since the transmission control unit A is sending the token frame 501, it cannot relay the received token frame 503 until it completes the transmission. As a result, only a portion 503B of the received frame 503 which has been received after the transmission of the token frame 501 is sent to the transmission line as a relay frame 506 and hence the token frame 503 lacks a portion 506A corresponding to a head portion 503A of the received frame 503. The transmission control unit A resends a new token frame 507 which will take place of the defective token frame 506.

Figure 4:
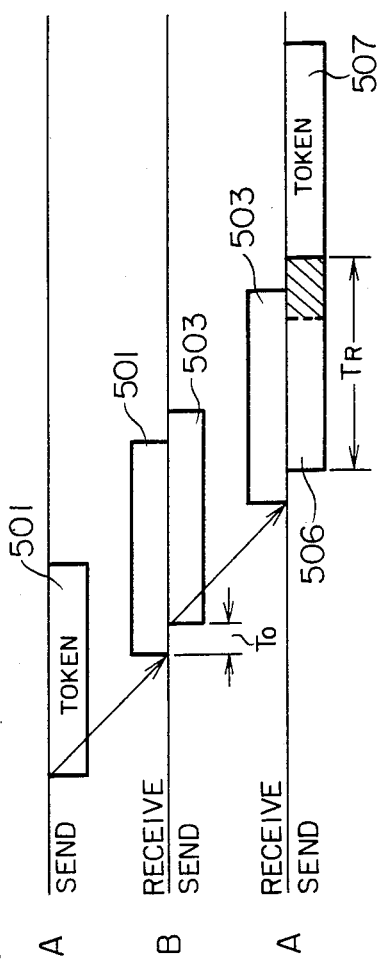

In FIG. 4, the loop transmission line is long, and the transmission control unit A receives the token frame 503 relayed by the transmission control unit B before it completes the transmission of the token frame 501. In the prior art, since the transmission control unit A cannot determine whether the token frame 503 which it relays is a deflective frame as shown in FIG. 3 or not, it invalides the token frame which it has sent when it receives such a token frame and resends the new frame 507. In the prior art, even if the received token frame is relayed without loss, a retransmission delay time $T_R$ shown in FIG. 4 is spent in the transmission control unit which sends the token each time the token is circulated through the loop.

Figure 5:
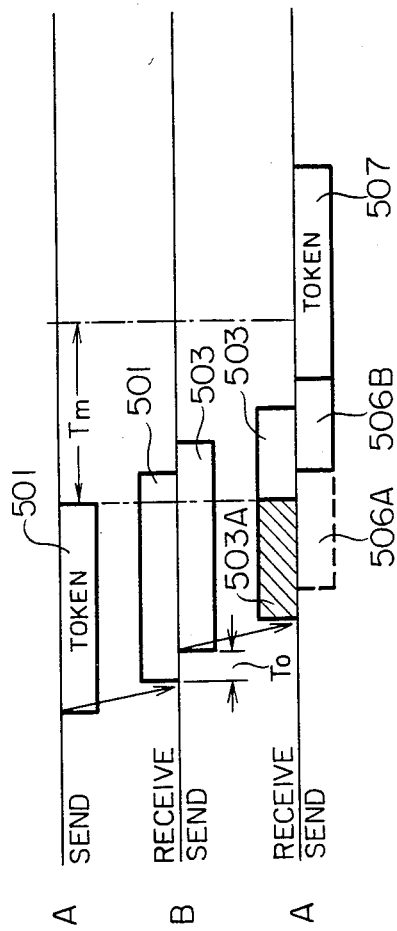
FIGS. 5 and 6 show time charts for illustrating re-transmission and relay of a token frame in the data transmission control of the present invention.
Figure 6:
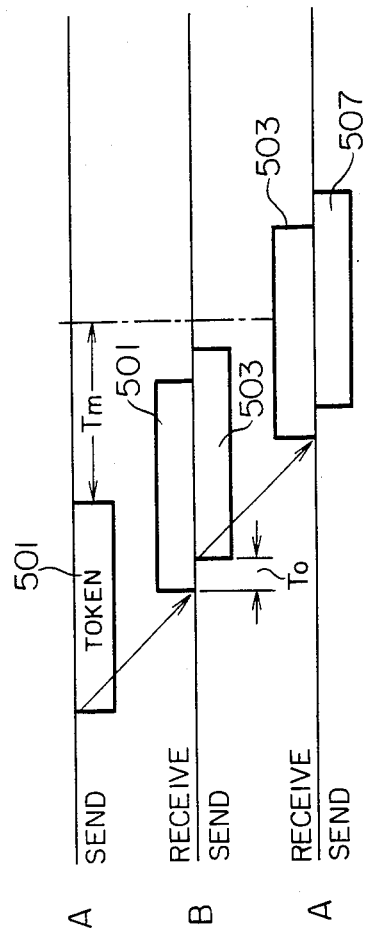

FIGS. 5 and 6 show relay time charts of the token frame by the data transmission control of the present invention. In the present invention, the transmission control unit A which sends the token frame 501 starts a timer after the completion of the transmission of the token frame, determines if the token which it has sent is sent back through the loop in a predetermined time $T_m$ (relay monitor time) before the timer times out, and determines whether a new token is to be resent or not depending on the above determination. The relay monitor time may be set to [word length of token frame - 1]octets or longer. If the transmission control unit A receives an end flag field 407 of the token frame 503 sent by the transmission control unit A and relayed by the transmission control unit B within the relay monitor time $T_m$ as shown in FIG. 5, the transmission control unit A determines that the head portion of the frame 503 has been received during the transmission of the token frame 501 and that the token frame 506 which it relayed is a defective frame. In this case, the transmission control unit A resends a new token frame 507 which will take place of the defective frame 506.

On the other hand, if the transmission control unit A receives the end flag field of the token frame 503 which it sent, after the relay monitor time $T_m$ as shown in FIG. 6, the transmission control unit A determines that the token frame which it sent has been received after the completion of the transmission of the token frame and that the relay has been done normally. In this case, the retransmission of the token frame shown in FIG. 4 is not necessary.

Figure 7:
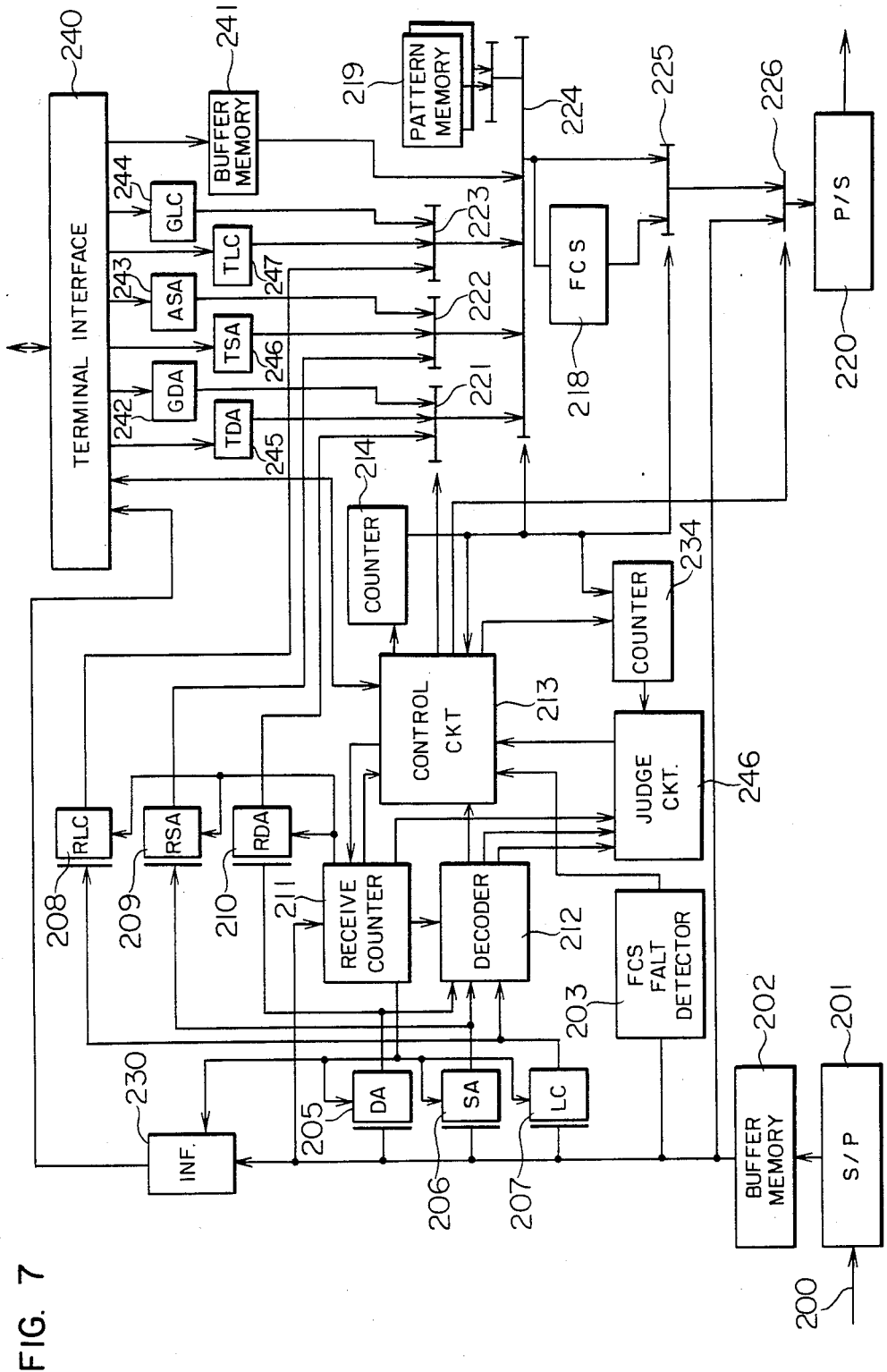
FIG. 7 shows a block diagram of one embodiment of a data transmission control unit of the present invention.

FIG. 7 shows an embodiment of the data transmission control unit of the present invention for transmitting and relaying the token frame.

A serial input signal 200 received from the loop transmission line is converted to parallel data, one octet at a time, by a serial-parallel converter 201, and it is supplied to a buffer memory 202. A difference between a frequency of an input signal from the loop transmission line and a processing frequency of the data transmission control unit is absorbed in the buffer memory 202. Numeral 211 denotes a counter for counting the octet of the received frame read from the buffer memory 202. In response to a latch signal produced in accordance with the count of the counter 211, a destination address (DA) 402, a source address (SA) 403 and a type code (LC) 404 in the received frame are loaded into registers 205, 206 and 207, respectively. When the received frame is a message frame, an information field (I) is loaded into a register 230. Numeral 212 denotes a decoder for decoding the contents of the registers 205 and 206, and it supplies various signals to a transmit/receive control circuit 213 and a decision circuit 246. The transmit/receive control circuit 213 generates a control signal for selecting a transmission mode of a received information field to a terminal device, a transmission mode of a message frame including transmission data from the terminal device, transmission/retransmission mode of the token frame and a relay mode of a received frame, in accordance with the type signal and address signals of the received frame supplied through the decoder 212, an output of an FCS error detector 203 and an output of the decision circuit 246.

Numerals 208, 209 and 210 denote registers for storing the contents of LC, SA and DA of the received frame for retransmission of the token frame. Numeral 240 denotes a connection interface between the terminal device and the data transmission control unit, numeral 241 denotes a buffer register for storing transmission data from the terminal device, which constitutes an information field of a transmission message frame, numerals 242, 243 and 244 denote registers for storing a destination address (GDA) of the token frame sent from its own unit, an assigned source address (ASA) and a frame type code (GLC), and numerals 245, 246 and 247 denote registers for storing a destination address (TDA), a source address (TSA) and a frame type code (TLC) of the transmission message frame.

Numeral 211 denotes a destination address selector for selecting an output of the register 210, 242 or 245, numeral 222 denotes a source address selector for selecting an output of the register 209, 243 or 246, and numeral 223 denotes a frame type code selector for selecting an output of the register 208, 244 or 247. Those selectors are controlled by a control signal from the transmit/receive control circuit 213. Numeral 224 denotes a selector for selecting the outputs of the selectors 221-223, an output of a buffer 241 or an output of a register 219 which stores a fixed pattern such as a flag or invalid signal (time fill signal). The selector 224 sequentially selects the contents of the fields in a sequence of the format of the transmission frame shown in FIG. 2 in accordance with the output signal of the counter 214 which is started by the transmit/receive control circuit 213. Numeral 218 denotes a circuit which receives the output of the selector 224 to prepare a frame check sequence (FCS), which is supplied from the selector 225 to the selector 226 at a timing following to the LC field in case of the token frame, and at a timing following to the information field supplied from the buffer 241 in case of the message frame. The selector 226 selects the received frame supplied from the buffer memory 202 or the transmission frame supplied from the selector 225. When the selector 226 selects the received frame, the received frame is relayed. When the relay frame is a message frame sent from its own unit, the control circuit 213 selects the time fill pattern from the memory 219 in order to invalidate the message frame and causes the selected time full pattern to be sent to the loop at a predetermined timing. The output of the selector 226 is sent to the loop transmission line through the parallel-serial converter 220.

In the transmission control unit, whether the retransmission of the token shown in FIGS. 5 and 6 is required or not is determined in the following manner.

The transmit/receive control circuit 213 sends the transmission data from the terminal device as a message frame and then controls the selector to send the token frame which its own unit has sent, and starts the counter 214. When the bit pattern representing the end flag of the token frame is sent from the register 219 through the selectors 224 and 225, a signal representing an end of token transmission is supplied from the counter 214 to the counter 234 which counts the relay monitor time Tm. The counter 234 starts the counting in response to the input signal and supplies to the decision circuit 246 a status signal indicating whether it is in the relay monitor time or not. The decision circuit 246 receives from the decoder 212 a signal indicating whether the received frame is a token frame or not, and a signal indicating whether it has been sent from its own unit or not. The decision circuit also receives from the receive counter 211 a signal indicating the end of the received frame. Based on those input signals, the decision circuit 246 determines whether the token frame sent by its own unit has been received within the relay monitor period Tm, and when the token frame sent by its own frame is received, it supplies a signal indicating whether the retransmission of the token is required or not, to the transmit/ receive control circuit 213.

When the transmit/receive control circuit completes the transmission of the token frame sent by its own unit, it switches the selector 226 to the received frame relay mode. The transmit/receive control circuit 213 selects the register 208, 209 or 210 by the selectors 221-223 if the retransmission of the token is requested by the decision circuit 246, and starts the counter 214 to retransmit the received token. If the signal indicating the retransmission of the token is not supplied by the decision circuit 246, it means that a normal token frame has been relayed.

In accordance with the present invention, since the wasteful retransmission of the token frame sent by the own unit is avoided, the relay delay time of the token frame in the data transmission control unit is reduced and the system utilization efficiency is improved.

I claim:

1. A method for controlling transmission token frames for a loop transmission system provided with a plurality of data transmission control units connected through a loop transmission line having one data transmission direction, comprising the following steps of:
   by means of one of said data transmission control units, sending out a token frame to said loop transmission line, said token frame including the address assigned to said unit in the source address field of said token frame;
   when no data transmission request is issued, relaying a token frame received by each of the data transmission control units from upstream of the transmission line to downstream of the transmission line;
   when the data transmission control unit which sent out said token frame receives said previously transmitted token frame, determining whether the reception has occurred within a predetermined time after said token frame was sent out; and
   if said reception has occurred within said predetermined time, resending the token frame including its assigned address in said source address field of said token field.

2. A method for controlling transmission of token frames according to claim 1 wherein said predetermined time is determined by a time required to send one token frame, and said determination step determines whether the receipt of a rear end of the token frame is within said predetermined time or not.

3. A loop transmission system comprising a loop transmission line having one data transmission direction and a plurality of data transmission control units connected to said loop transmission line for transmitting and receiving message frames and token frames,
   each of said data transmission control units comprising:

first means connected to the upstream side of said loop transmission line for receiving a frame signal sent from upstream of said loop transmission line;

second means connected between said first means and the downstream side of said loop transmission line for relaying the received frame signal to downstream of said loop transmission line;

third means connected to the downstream side of said loop transmission line for sending a message frame generated by its own unit to downstream of said transmission line;

fourth means connected to the downstream side of said loop transmission line for sending a token frame including an address assigned to its own unit as a source address to downstream of said transmission line;

fifth means connected to said second, third and fourth means for selectively activating said second, third and fourth means; and sixth means connected to said fifth means for counting a time after the token frame has been sent by said fourth means;

said fifth means determining whether the token frame is to be retransmitted by said fourth means or not in accordance with the time counted by said sixth means when said first means receives the token frame sent from its own unit.

4. A loop transmission system according to claim 3 wherein said sixth means produces a signal indicating whether a predetermined time determined by a length of the token frame has elapsed after the token frame was sent by said fourth means, and said fifth means retransmits the token frame when the token frame sent by its own unit is received within said predetermined time.

* * * * *

UNITED STATES PATENT AND TRADEMARK OFFICE
CERTIFICATE OF CORRECTION

PATENT NO. : 4,813,039
DATED : March 14, 1989
INVENTOR(S) : Yoshihiro Takiyasu

It is certified that error appears in the above-identified patent and that said Letters Patent is hereby corrected as shown below:

Title page:

Please amend the Inventor's name as follows:

Change "Takiyasu Yoshihiro" to --Yoshihiro Takiyasu--.

Item [19]: "Yoshihiro" should read --Takiyasu--.

Signed and Sealed this

Third Day of October, 1989

Attest:

DONALD J. QUIGG

Attesting Officer

Commissioner of Patents and Trademarks